No. 752,787. Patented February 23, 1904.

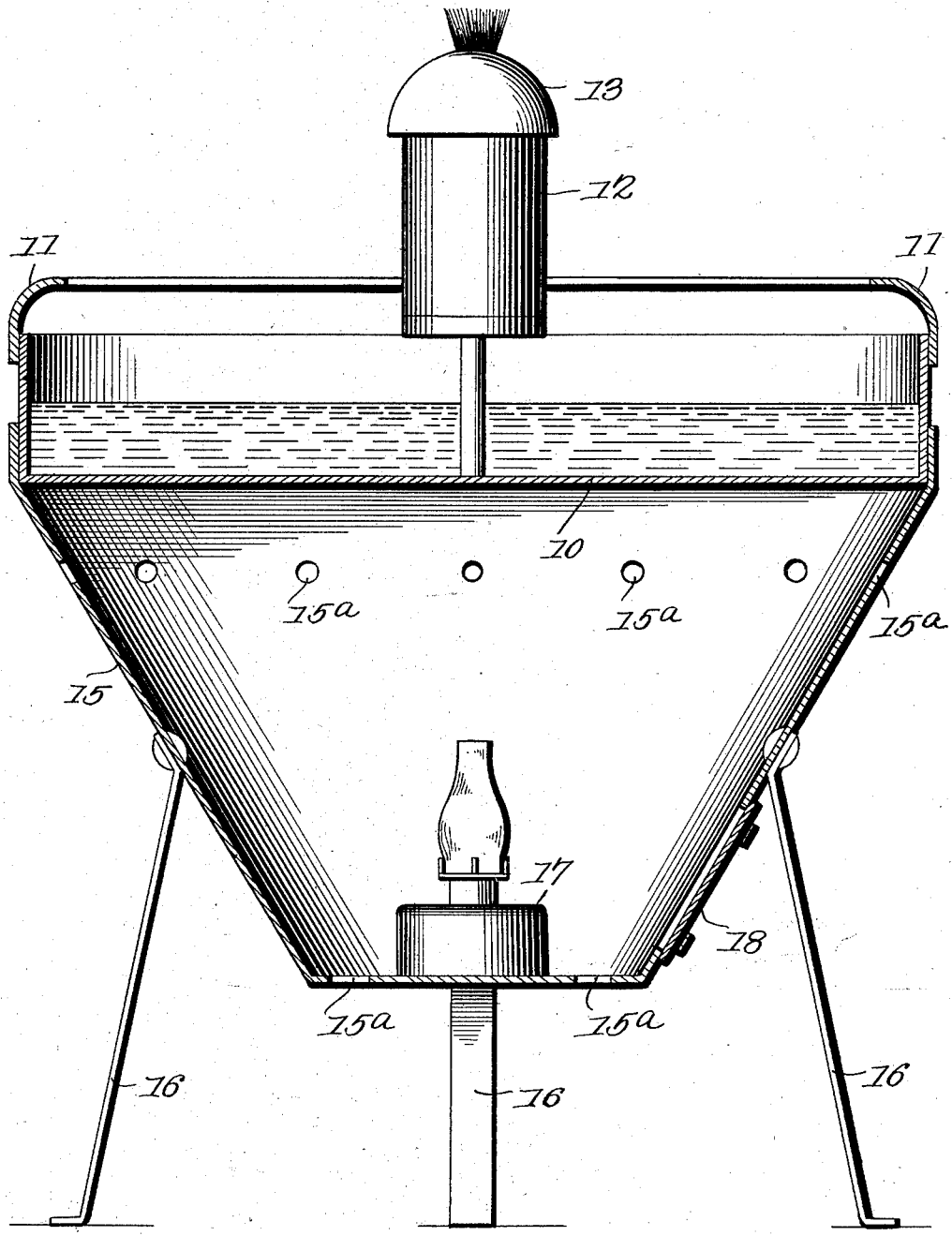

UNITED STATES PATENT OFFICE.

JAMES A. LOGSDON, OF ALEY, TEXAS.

INSECT-DESTROYER.

SPECIFICATION forming part of Letters Patent No. 752,787, dated February 23, 1904.

Application filed January 27, 1903. Serial No. 140,781. (No model.)

*To all whom it may concern:*

Be it known that I, JAMES A. LOGSDON, a citizen of the United States, residing at Aley, in the county of Henderson and State of Texas, have invented a new and useful Insect-Destroyer, of which the following is a specification.

This invention relates to insect-destroyers, the object being to provide a simple, inexpensive, and efficient device which will attract and destroy insects—such as moths, millers, mosquitoes, bugs, beetles, and the like—but which is more particularly designed to attract and destroy the insects which infest cotton-plants.

Further objects and advantages of this invention will appear in the following description, and the novel features thereof will be particularly pointed out in the appended claims, it being understood that various changes in the form, proportion, and the minor details of construction may be resorted to without departing from the spirit or sacrificing any of the advantages of this invention.

The drawing represents a vertical sectional side elevation of the device complete.

The improved device consists of a pan or receptacle 10 of any suitable size and adapted to contain water or other liquid and having a removable and inwardly-extending rim or ring 11 engaging the edge thereof to prevent the insects from crawling out after they have once fallen into the same.

Supported in any suitable manner above the liquid in the receptacle and preferably extending above the rim or ring 11 is a lamp or torch 12, preferably provided with a sloping cover or shield 13 to prevent the insects from lodging thereon. Any suitable form of lamp or torch may be used and supported in any suitable manner and having the sides formed without obstructions upon which the insects can lodge.

Beneath the receptacle 10 is a casing 15, supported on legs 16 and provided with a plurality of openings or apertures 15ª for the purpose of supplying proper ventilation to the lamp 17 or other means disposed within the casing for imparting heat to the liquid in the receptacle 10 and which may be of any suitable form adapted for the purpose.

The device is designed to be placed among the plants to be protected, and the legs 16 will be made sufficiently long to support the lamp or torch 12 above the tops of the plants in position to attract the insects which will fall into the receptacle containing the heated liquid, the light from the heating means being shielded by the inclosing casing 15 to prevent its attracting insects to the lower portion of the device and allowing them to escape the trap set for them.

The pan 10 and the lamp 17 will preferably be detachable from the casing to permit the receptacle to be emptied and replenished and the lamp to be trimmed and supplied with oil.

The entire device except the lamps or heaters will preferably be made of sheet metal and portable to enable it to be readily moved from place to place.

It is to be understood that ventilation may be supplied to the lamp 17 in any desired manner, the perforations in the casing being the preferred form.

I claim as my invention—

1. A device of the class described comprising a casing, heating means disposed within the casing, a liquid-receptacle supported by the casing above the heating means, and a light-radiating medium supported by the liquid-receptacle.

2. A device of the class described comprising a casing, a lamp or torch within the casing, a liquid-receptacle removably supported by the casing above the lamp or torch, and a torch supported by the liquid-receptacle.

3. A device of the class described comprising a casing, heating means detachably supported within the casing, a liquid-receptacle supported by the casing above the heating means, and a lamp supported by the receptacle.

4. A device of the class described, comprising an inclosing casing having ventilating-openings, a door, and heating means located within the casing, a liquid-receptacle supported by the casing and closing the top thereof, and a lamp supported by the receptacle.

5. A device of the class described comprising a ventilated casing, a lamp located within the casing, a cover for said casing constructed to form a receptacle and a lamp supported above the cover.

6. A device of the class described comprising a casing provided with ventilating-openings, supports for said casing, and a lamp or torch located within the casing, a liquid-receptacle supported by the casing above the lamp, and a lamp supported above the receptacle, said receptacle being provided with an inwardly-extending rim.

7. A device of the class described comprising a casing, heating means located within the casing, a receptacle supported by the casing above the heating means, an inwardly-inclined ring removably engaging the top of the receptacle, and a lamp supported by the receptacle and extending above the ring.

In testimony that I claim the foregoing as my own I have hereto affixed my signature in the presence of two witnesses.

JAMES A. LOGSDON.

Witnesses:
E. P. MILLER,
R. C. FAULK.